(12) United States Patent
Baker

(10) Patent No.: US 8,687,050 B2
(45) Date of Patent: Apr. 1, 2014

(54) STEREOSCOPIC EXTINCTION RATIO TEST PATTERN

(75) Inventor: Daniel G. Baker, Beaverton, OR (US)

(73) Assignee: Tektronix, Inc., Beaverton, OR (US)

(*) Notice: Subject to any disclaimer, the term of this patent is extended or adjusted under 35 U.S.C. 154(b) by 17 days.

(21) Appl. No.: 12/958,530

(22) Filed: Dec. 2, 2010

(65) Prior Publication Data
US 2012/0140225 A1 Jun. 7, 2012

(51) Int. Cl.
*H04N 13/04* (2006.01)
*H04N 9/47* (2006.01)

(52) U.S. Cl.
USPC ............. 348/51; 348/52; 348/53; 348/54; 348/60

(58) Field of Classification Search
USPC ............................................. 348/51–60
See application file for complete search history.

(56) References Cited

U.S. PATENT DOCUMENTS

| | | | | |
|---|---|---|---|---|
| 6,060,710 A | * | 5/2000 | Carrieri et al. | 250/338.1 |
| 6,359,664 B1 | * | 3/2002 | Faris | 349/15 |
| 6,369,933 B1 | * | 4/2002 | O'Callaghan | 359/247 |
| 6,377,230 B1 | * | 4/2002 | Yamazaki et al. | 345/7 |
| 2007/0127121 A1 | * | 6/2007 | Maximus et al. | 359/465 |
| 2007/0188602 A1 | * | 8/2007 | Cowan et al. | 348/53 |
| 2007/0206155 A1 | * | 9/2007 | Lipton | 353/7 |
| 2008/0297592 A1 | * | 12/2008 | Oyamada et al. | 348/51 |
| 2008/0316303 A1 | * | 12/2008 | Chiu et al. | 348/51 |

* cited by examiner

*Primary Examiner* — Chikaodili E Anyikire
(74) *Attorney, Agent, or Firm* — Michael A. Nelson; Marger Johnson & McCollom PC

(57) ABSTRACT

A test pattern for evaluating L/R crosstalk extinction ratio in a stereoscopic 3D system has a strip of one characteristic—polarization, white, color—associated with a plurality of calibrated chips in a left eye image and a strip of a contrasting characteristic—orthogonal polarization, white, contrasting color—associated with a plurality of calibrated chips in a right eye image such that, when the two images are superimposed, the strip of one image overlays the calibrated chips of the other image. By alternately occluding one eye while observing the superimposed image with the other eye, a portion of the strip of the occluded eye image appears across the chips of the viewing eye image when there is crosstalk. The extinction ratio value associated with the chip of the viewing eye image that most closely matches the portion of the strip from the occluded eye image is an estimate of the L/R crosstalk.

15 Claims, 2 Drawing Sheets

STEREOSCOPIC EXTINCTION RATIO TEST PATTERN

BACKGROUND OF THE INVENTION

The present invention relates to stereoscopic test instrumentation, and more particularly to a stereoscopic extinction ratio test pattern for Left/Right (L/R) crosstalk evaluation.

One of the problems with stereoscopic three-dimensional (3D) video and 3D movies is crosstalk between the left and right eye images. 3D videos and movies require two separate images, one for viewing by the left eye and the other for viewing with the right eye. When the two images are shown together, the viewer sees a stereoscopic 3D image. When one eye is occluded in some manner from seeing the 3D image, what should be seen is only the image intended for the viewing eye. However there is always some L/R crosstalk where some of the left eye image is seen by the right eye when the left eye is occluded and vice versa, giving an appearance of "ghosting." The ghosting occurs when the occlusion technique, which is used for assuring that each eye only sees the image intended for that eye, does not sufficiently attenuate the image for the other eye. The technologies for stereoscopic 3D provide different degrees of crosstalk, but none are completely free from this problem. The current technologies are discussed below.

An "active shutter" method time-multiplexes the left and right images on a display, such as liquid crystal diode (LCD), cathode ray tube (CRT), projector/screen displays and the like, and active shutter glasses are worn by the viewer. The image rate is above 60-120 Hz, and well above the flicker fusion frequency of the human eye, i.e., no large area flicker. The active shutter glasses are synchronized with the display so when the shutter is active for the left eye only the left eye image is shown on the display and vice versa. In other words, only the proper image is seen by each eye—the left eye sees only the left image and the right eye sees only the right image. This technology provides the best isolation and minimum ghosting or L/R crosstalk, since the active shutter glasses block the light very well, although not completely. Many new television sets already have this capability. However the active shutter glasses are bulky, and present a problem for those viewers who already wear prescription glasses, as opposed to contact lenses. This may be acceptable for short periods in a movie theater, but may not be acceptable when viewing television or movies in the privacy of the viewers' own living room.

Another technique is a polarization technique using passive glasses. In this method the video or displayed light image is a composite of two orthogonal polarized images. The left and right eye images are displayed at the same time with clockwise and anti-clockwise, circular polarization respectively in the more recent methods. +45 and −45 degree linear polarization also has been used in the past, the common factor being that the polarization is orthogonal. However the circular polarization technique performs better on some projection screens and the crosstalk is not dependent upon the head tilt of the viewer. Currently micro-polarized LCD laptop and desktop panel displays are available where each line alternates in the twist of circular polarization. Also movie theaters superimpose the left and right images with opposing twist of circular polarization using special silver screens that retain the polarization. In both cases passive glasses, that are much less bulky than the active shutter glasses, are used, where each lens is a circular polarizer of opposite twist. Since these polarized lenses are not perfect, and the special silver screen in theaters is not perfect, some of the left image leaks into the right eye and vice versa, creating ghosting or crosstalk.

A third anaglyphic technique uses color-filter passive glasses. In this method the light images from the display contain left and right images that are also superimposed, but separately colored, so that one image is a complement color to the other. The anaglyph glasses have opposing color filters for each eye lens that pass one color and block the other. Some are either magenta/green, as in the digital video disc (DVD) of the movie "Coraline", for example, or more commonly red/cyan. The anaglyph glasses are very cheap and current two-dimensional (2D) color displays, such as television sets, projectors, etc., may be used. This provides a distinct advantage over the polarization and active shutter methods described above. However the anaglyph glasses are not good for color video/film and the filters on each eye in the glasses have even more crosstalk. This makes the ghosting even worse.

Another technique or technology for displaying stereoscopic 3D does not require any glasses at all, and is commonly called "auto-stereoscopic." Several methods exist, with the most common based on a parallax barrier, pixel overlay that blocks the left eye view from the image pixels for the right eye view, and vice versa. See http://en.wikipedia.org/wiki/Autostereoscopy#Parallax barrier. These displays do not require the viewer to wear glasses, but most have a limited viewing zone in both angular position as well as viewer distance from the display. A primary distortion that occurs as the viewer moves away from the center of the optimal viewing zone is crosstalk, as discussed above. In fact, the limits of usable display zones are sometimes specified in terms of crosstalk, such as less than five percent (5%) crosstalk within an inner zone and less than fifteen percent (15%) crosstalk over a wider viewing zone.

The crosstalk or image-extinction ratio between the left and right eyes in both the polarized and anaglyphic methods depends on several factors—the quality of the glasses (polarizer or band-pass color filters) and, in projection displays, the ability of the screen to retain the polarization or maintain the correct colorimetry. For theater displays polarization crosstalk may also vary with viewing angle or screen uniformity/quality. As discussed at a Society of Motion Picture and Television Engineers (SMPTE) conference, L/R crosstalk of less than one percent (1%) is desired, but seldom achieved, for 3D movie theaters.

What is desired is a simple test pattern for evaluating L/R crosstalk in a stereoscopic 3D display that is useful for all current techniques discussed above.

DETAILED DESCRIPTION OF THE INVENTION

Figure 1A:
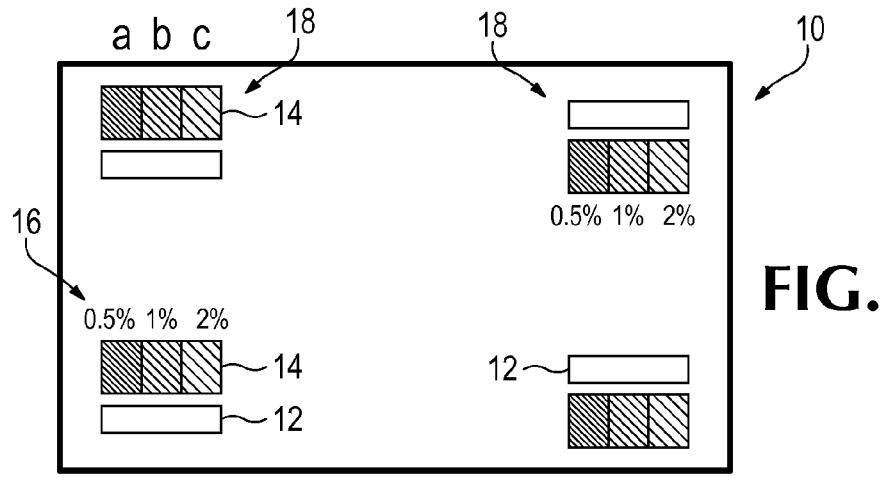
FIGS. 1a and 1b are illustrative plan views of a test pattern for evaluating L/R crosstalk of a stereoscopic 3D image according to the present invention.
Figure 1B:
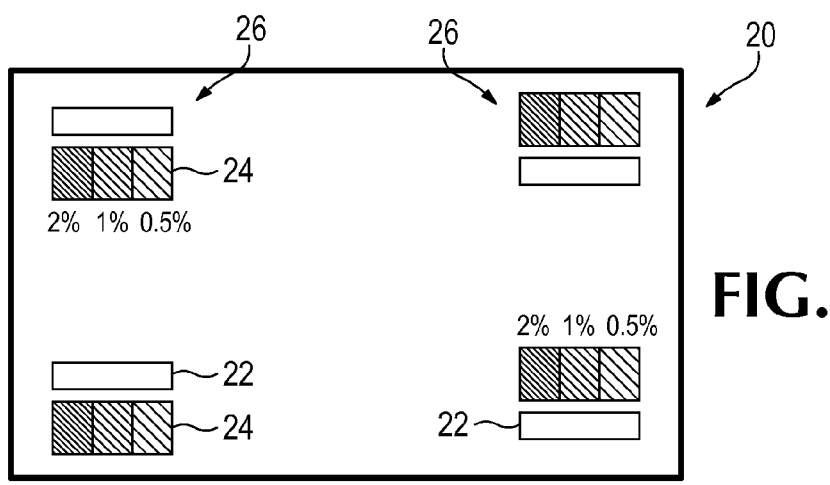

Referring now to FIGS. 1a and 1b, a left eye image 10 and a right eye image 20 are shown. For the purpose of this illustration, grey scale is used. Each image has one or more L/R extinction ratio patterns 18, 26, each pattern having a 100% white strip 12, 22 as a reference strip or region adjacent a plurality of contiguous grey scale "chips" 14a, 14b, 14c, 24a, 24b, 24c that form a calibration strip or region. The combination of the reference strip and calibration strip form an L/R extinction ratio pattern. Each chip 14, 24 has a different, calibrated white/black ratio, from dark to light. When the left and right images 10, 20 are superimposed, the white strip 12 of the left image overlays the contiguous chips 24 of the right image and vice versa. For complete stereoscopic extinction, when the combined image is looked at with the left eye, the image 10 of FIG. 1a is seen, and when the combined image is looked at with the right eye, the image 20 of FIG. 1b is seen.

Figure 2:
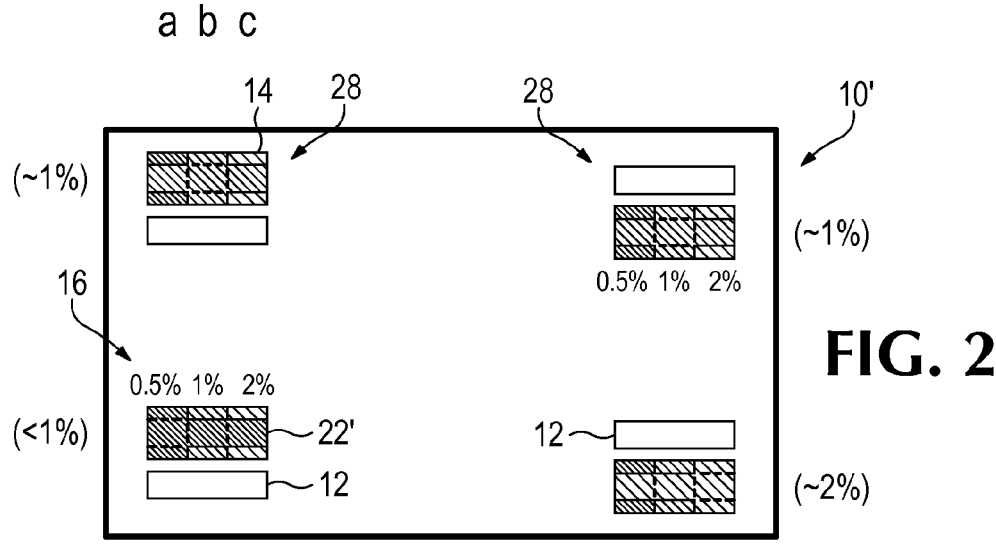
FIG. 2 is an illustrative plan view of the combination of the test pattern shown in FIGS. 1a and 1b with the right eye closed according to the present invention.

However, more commonly what is seen is a slightly degraded image 10' when the right eye of a viewer/evaluator closed, as shown in FIG. 2. It appears almost exactly the same as shown in FIG. 1a, the left eye image 10. Yet across the chips 14 is seen a faint strip 22' that is leakage of the right eye image 20 into the left eye image 10, i.e., crosstalk. Each chip 14 is calibrated with a crosstalk or extinction ratio value 16, which may be determined empirically—in this example ranging from 0.5% to 2%, i.e. from the darkest calibrated chip 14a to the lightest calibrated chip 14c. The calibrated chip 14 that most closely matches the leakage strip 22' in grey scale is indicative of the L/R crosstalk ratio. The viewer/evaluator alternatively closes each eye and the leakage strip 22' overlays the calibrated chips 14 so as to allow a visual comparison of the leakage or ghost image to the nearest chip value 16 for each eye independently. In this way the extinction ratio for each eye may be well estimated. As shown in FIG. 2 the upper right pattern 16 indicates an extinction ratio of approximately 1%, while the lower right pattern indicates an extinction ratio of approximately 2%.

More calibrated chips 14, 24 may be used for more resolution in quantifying the extinction ratio or leakage. The L/R extinction pattern 18, 26 may be placed at different screen locations in cases where the uniformity of extinction is not constant across the display area. The L/R pattern 18, 26 may be combined with other registration patterns to allow the extinction ratio as well as L/R registration and depth disparity to be evaluated with a single, combined pattern. In this particular example there are four L/R patterns 18, 26 located in the four corners of the display area, with the center region left available for the L/R registration and depth disparity evaluation patterns (not shown). This available area is also useful for commonly used contrast and black level adjustment patterns, such as the "Pluge" in studio video color bar line-up pattern, described on the Internet at http://www.poynton.com/PDFs/Brightness and Contrast.pdf. In fact, it is preferable that display gamma and black level be adjusted to nominal by any standard means to obtain the best accuracy in estimating the crosstalk level with the L/R pattern 18, 26. Animation or motion of the L/R pattern 18, 26 may be added as well to validate perceived extinction ratio on active shutter or temporally multiplexed left and right stereoscopic displays for both static and moving images.

Figure 3:
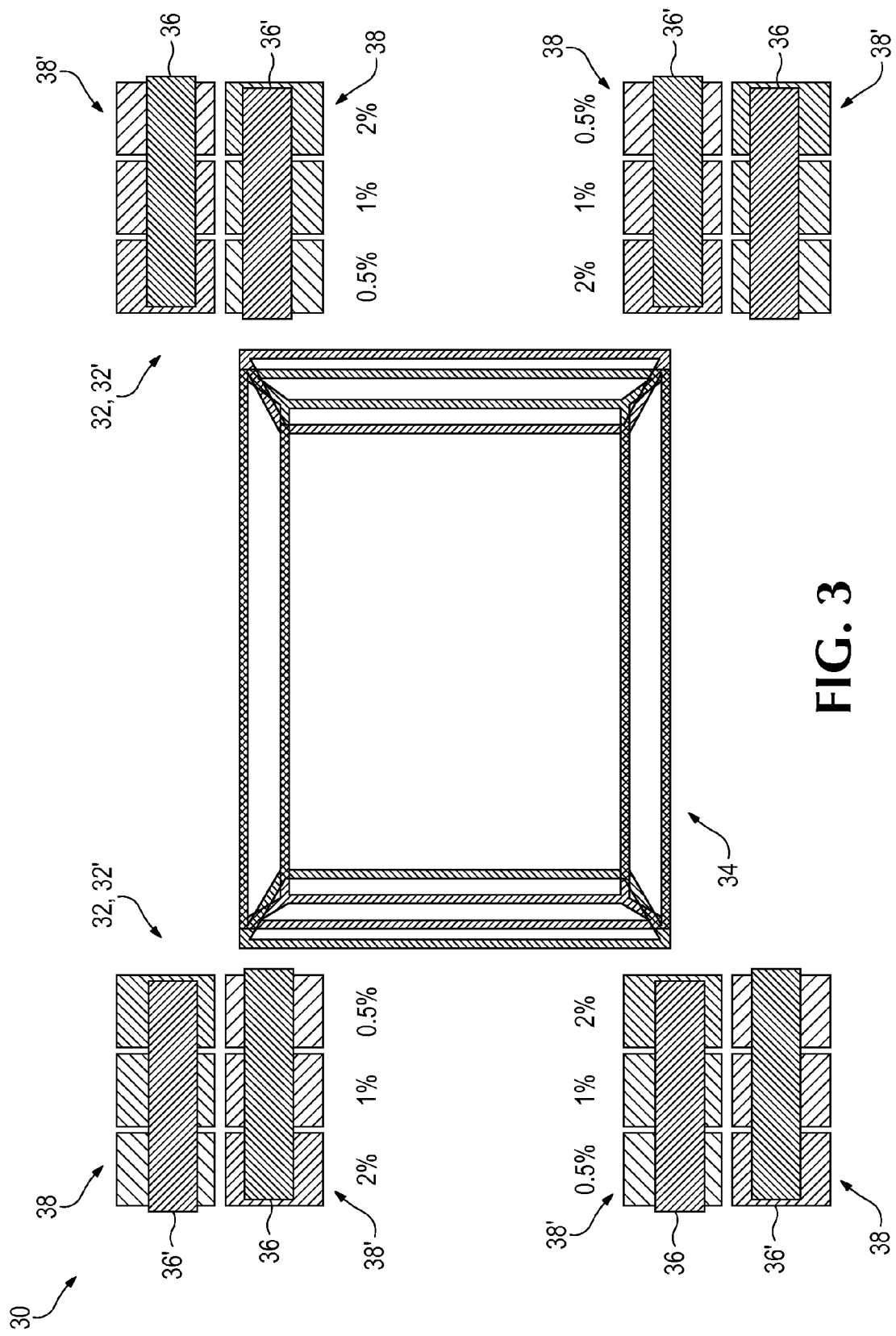
FIG. 3 is an illustrative plan view of the combination of two color test patterns superimposed as they appear without passive anaglyph glasses according to the present invention.

FIG. 3 shows a composite or superimposed left/right images 30 having the L/R pattern 32, 32' at the four corners with the central region 34 reserved for other evaluation patterns—L/R registration, depth disparity, motion, etc. As shown each L/R pattern 32, 32' has a color strip 36, 36' of one color, the reference strip or region, superimposed over contiguous calibrated chips 38, 38' of another color, the calibration strip or region, where each calibrated chip is a different ratio of the two colors. When viewed with the appropriate anaglyphic glasses, a stereoscopic 3D color image appears, but with some noticeable crosstalk as determined by leakage strips that appear against the calibrated chips 38, 38' of the opposing color when viewed with one eye or the other closed. Color combinations may include red/green, red/cyan, magenta/green, etc. or negatives thereof.

Although for purposes of illustration the reference and calibration regions are shown as strips, the regions may be of any desired configuration so long as, when superimposed, the reference region of one image overlays the calibration region of the other image so a comparison may be made of the leakage from one eye image to the other image, i.e., a leakage region from one image (closed eye image) overlays the calibration region of the observed image (open eye image). Each image making up the stereoscopic pair of images has an opposite characteristic to each other, such as polarity or color. For black and white images, the contrast or opposite characteristic is white against black.

Therefore in evaluating stereoscopic 3D extinction for L/R crosstalk, a stereoscopic image is displayed having one or more L/R patterns in corresponding locations for both the left eye image and the right eye image. The L/R patterns have a reference region, such as a strip, of one polarity/color/white and a plurality of calibrated chips forming the calibration region, such as contiguous calibration chips in a strip, that are different ratios of the one polarity/color/white to another orthogonal polarity/color/black. The L/R patterns for the left and right eye images are opposite to each other so that, when superimposed, the respective reference regions of one image overlay the respective calibration chips of the other image. An evaluator then views the superimposed image—using appropriate 3D glasses if required—and closes one eye and then the other, observing where a leakage region from the occluded eye most closely matches a calibrated chip as seen by the viewing eye. The percentage value associated with the matching calibrated chip provides the extinction ratio.

Thus the present invention provides an L/R pattern for evaluation of stereoscopic 3D extinction for L/R crosstalk by superimposing left and right images having one or more of the L/R patterns, each pattern having a reference region and a calibration region of contiguous calibrated chips representing different extinction ratios which values are displayed with the chips, where the reference region of one image overlays the calibration region of the other image and vice versa when superimposed.

What is claimed is:

1. A stereoscopic test instrument that generates a test pattern for evaluating stereoscopic 3D extinction of L/R crosstalk comprising:

a video device for displaying the test pattern;

a left eye image having a reference region of a first characteristic and a calibration region formed by a plurality of calibrated chips representing different pre-determined extinction ratios; and a right eye image having a reference region of a second characteristic and a calibration region formed by a plurality of calibrated chips representing different pre-determined extinction ratios, the respective reference regions and calibration regions being positioned such that, when the left and right images are overlaid on the video device, the reference region of the left image overlays the calibration region of the right image, and the reference region of the right image overlays the calibration region of the left image, in which a percentage value of each pre-determined extinction ratio associated with the plurality of calibrated chips is presented to a viewer in the overlaid left image and the overlaid right image.

2. The stereoscopic test instrument as recited in claim 1, wherein the stereoscopic test instrument further includes:

a first polarization characteristic having a +45 linear polarization and clockwise polarization; and a second polarization characteristic having a −45 linear polarization and anti-clockwise circular polarization.

3. The stereoscopic test instrument as recited in claim 2 wherein the first polarization characteristic is selected from a first polarization group, white and a specified first color and the second characteristic is selected from second polarization group, the second polarization characteristic being orthogonal to the first polarization characteristic, white and a specified second color that contrasts with the specified first color.

4. The stereoscopic test instrument as recited in claim 3 wherein the specified first color is selected from the group consisting of red, magenta and negatives thereof and the specified second color is selected from the group consisting of green, cyan and negatives thereof.

5. The stereoscopic test instrument as recited in claim 1, wherein the pre-determined extinction ratios include a ratio selected from within a range from 0.5% to 2.0%.

6. The stereoscopic test instrument as recited in claim 1 wherein the calibrated chips for the left and right images comprise specified ratios of the first and second characteristics.

7. A method of evaluating L/R crosstalk in a stereoscopic image comprising the steps of:

superimposing a left eye image and a right eye image on a test instrument having a video device to produce the stereoscopic image, the left and right eye images having minor image contrasting test patterns such that a reference region having a first characteristic in the left eye image overlays a first group of calibrated chips forming a calibration region in the right eye image and a reference region having a second characteristic contrasting with the first characteristic in the right eye image overlays a second group of calibrated chips forming a calibration region in the left eye image, the calibrated chips being ratios of the first and second characteristics and having displayed adjacent thereto a corresponding pre-determined extinction ratio value;

accepting a selection of a first polarization characteristic having +45 linear polarization and clockwise circular polarization;

accepting a selection of a second polarization characteristic having −45 linear polarization and anti-clockwise circular polarization;

presenting to a viewer a percentage value of each pre-determined extinction ratio value associated with the calibrated chips of the overlaid left image and the overlaid right image; and estimating the pre-determined extinction ratio by determining the closest displayed pre-determined extinction ratio value displayed adjacent to the calibrated chip for one of the left and right eye images, when the other eye is occluded, having the closest match to the portion of the reference region for the other one of the left and right eye images, in which the pre-determined extinction ratio includes a ratio selected from within a range from 0.5% to 2.0%.

8. A computer storage device having a test pattern for evaluating stereoscopic 3D extinction of L/R crosstalk wherein the test pattern comprises:

a left eye image having a reference region of a first characteristic and a calibration region formed by a plurality of calibrated chips representing different pre-determined extinction ratios;

a right eye image having a reference region of a second characteristic and a calibration region formed by a plurality of calibrated chips representing different extinction ratios, the respective reference regions and calibration regions being positioned such that, when the left and right images are overlaid, the reference region of the left image overlays the calibration region of the right image, and the reference region of the right image overlays the calibration region of the left image, in which a percentage value of each pre-determined extinction ratio associated with the plurality of calibrated chips is presented to a viewer in the overlaid left image and the overlaid right image.

9. The computer storage device as recited in claim 8, wherein the computer storage device further includes:

a first polarization characteristic having a +45 linear polarization and clockwise polarization; and a second polarization characteristic having a −45 linear polarization and anti-clockwise circular polarization.

10. The computer storage device as recited in claim 9 wherein the first characteristic is selected from the group consisting of the first polarization characteristic, white and a specified first color and the second characteristic is selected from the group consisting of the second polarization characteristic orthogonal to the first polarization characteristic, white and a specified second color that contrasts with the specified first color.

11. The computer storage device as recited in claim 10 wherein the specified first color is selected from the group consisting of red, magenta and negatives thereof and the specified second color is selected from the group consisting of green, cyan and negatives thereof.

12. The computer storage device as recited in claim 8, wherein the pre-determined extinction ratios include a ratio selected from within a range from 0.5% to 2.0%.

13. The computer storage device as recited in claim 8 wherein the calibrated chips for the left and right images comprise specified ratios of the first and second characteristics.

14. The computer storage device as recited in claim 13 wherein the first characteristic is selected from the group consisting of the first polarization characteristic, white and a specified first color and the second characteristic is selected from the group consisting of the second polarization characteristic orthogonal to the first polarization characteristic, white and a specified second color that contrasts with the specified first color.

15. The computer storage device as recited in claim 14 wherein the specified first color is selected from the group consisting of red, magenta and negatives thereof and the specified second color is selected from the group consisting of green, cyan and negatives thereof.

\* \* \* \* \*